L. R. WRIGHT.
Cultivators and Plows Combined.
No. 5,532. Reissued August 12, 1873.
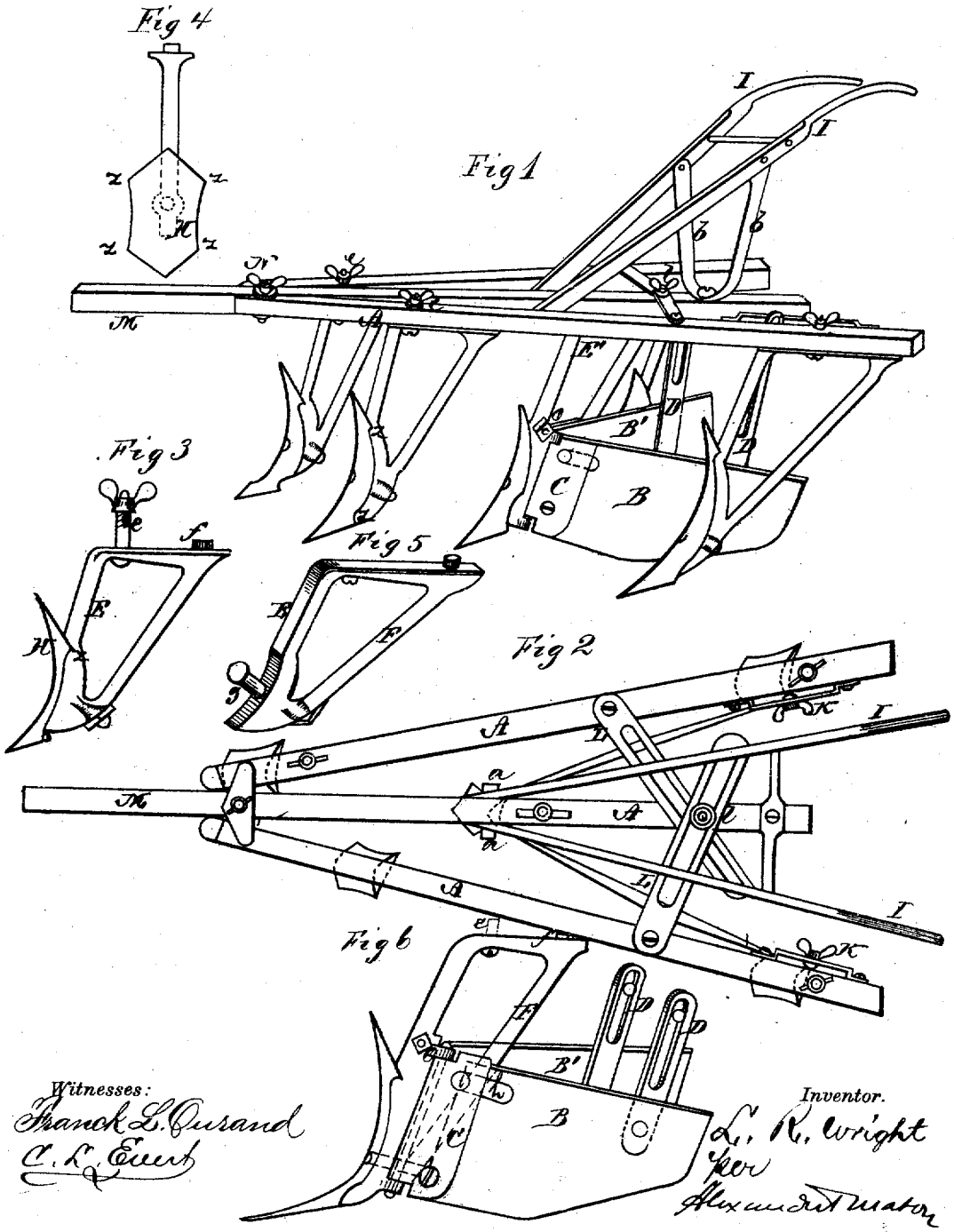
Witnesses:
Franck L. Durand
C. K. Ewert
Inventor.
L. R. Wright
per
Alexander Mason
Attorneys.
AM. PHOTO-LITHOGRAPHIC CO. N.Y. (OSBORNE'S PROCESS)

UNITED STATES PATENT OFFICE.

LEWIS R. WRIGHT, OF SCHENECTADY, NEW YORK.

IMPROVEMENT IN CULTIVATORS AND PLOWS COMBINED.

Specification forming part of Letters Patent No. 81,054, dated August 11, 1868; reissue No. 5,532, dated August 12, 1873; application filed May 21, 1873.

*To all whom it may concern:*

Be it known that I, LEWIS R. WRIGHT, of Schenectady, in the county of Schenectady and State of New York, have invented certain new and useful Improvements in Cultivator and Plow Combined; and I do hereby declare that the following is a full, clear, and exact description thereof, that will enable others skilled in the art to which it appertains to make and use the same, reference being had to the accompanying drawings and to the letters of reference marked thereon, which form a part of this specification.

Like letters represent and refer to like or corresponding parts.

Figure 1 is a perspective view of a plow and cultivator constructed in accordance with and containing my invention and improvements, hereinafter fully described and set forth. Fig. 2 is a top view of my said cultivator and plow, more clearly showing the construction of the various parts thereof, as hereinafter more fully described and set forth. Fig. 3 is a view of one of the standards, which is attached to the frame of the cultivator, and to which standard is attached the tooth of the cultivator, substantially as shown in the accompanying drawings, and more fully hereinafter described and set forth. Fig. 4 is a front view of one of the cultivator-teeth, more fully hereinafter described. Fig. 5 is a perspective view of one of the standards with the tooth removed therefrom, and showing the bolt by which the said tooth is attached thereto, as hereinafter fully described and set forth. Fig. 6 is also a perspective view, showing the center standard and tooth, and also showing the plow, and the manner of attaching and combining the same with the said center standard, as fully hereinafter described and set forth.

The nature of my said invention and improvements consists in combining with a cultivator a plow so arranged and connected therewith that the same may be used together or separately, as deemed best, substantially in the manner and for the purposes described and set forth. It also consists in hinging the mold-board to the center standard, as shown at Fig. 1, and by dotted lines at Fig. 6, so as to allow a lateral movement to the said mold-boards to regulate the width of the furrow, substantially as hereinafter described and set forth. It also consists in the use and employment of the double mold-boards B C, so connected and hinged together as to allow the raising and lowering of the larger section of the said mold-board B by means of the slotted arms D D, whereby the height of the furrow to be cut may be regulated and determined, substantially in the manner and for the purposes hereinafter fully described and set forth. It also consists in the use and employment of the six-pointed curved tooth H, substantially in the manner and for the purposes hereinafter described and set forth.

To enable others skilled in the art to which my invention relates to make and use the same, I will here proceed to describe the construction and operation thereof, which is as follows, to wit:

The frame A of my said cultivator and plow I design to make of some hard wood that will answer the required purpose, and of the form and of any size and strength required or deemed best. I I are handles, which are securely fastened to the frame A by means of the screws *a a*, Fig. 2, and the braces *b b*, Fig. 1, and which said handles are for the purpose of guiding and working the said plow, and are made of wood, of the usual size and construction. The standards E F, &c., are designed to be made of malleable iron, but cast-iron or wrought-iron may be used, and are securely fastened to the frame A by means of the screws and nuts *e e*, &c. The projections *f f*, &c., on the standards, which are shown at Figs. 3, 5, and 6, catch into recesses on the under side of the frame A, and aid in securely holding and fastening the said standards E F, &c., onto the said frame A. The teeth H H, &c., I design to make of steel, but other metal may be used, if desired, and of form and construction substantially as shown in the accompanying drawings. The teeth are made pointed at both ends, so as to be reversible, and by being made curved longitudinally, and flat, or nearly so, transversely, and with concave sides, as shown in the drawings, the earth is reversed and thrown over forward, instead of a simple furrow being cut through it, as heretofore, and roots are more effectually cut than by any tooth heretofore in use. The said teeth H H, &c., when used in the combination hereinafter claimed, are securely fastened to the standards E F, &c., by means of a nut or screw, *g*, Fig. 5. The standard directly under the arms I I, and marked E′, I call the center standard, and to this center standard I hinge the two sections of the mold-board, marked C, which allows the free working of the same, for the purposes hereinafter described. The main parts of the mold-boards B and B′ are fastened to the sections C and C′ by means of nuts and screws, and the upper bolt works in a slot, *h*, in the said mold-board B, whereby the said mold-boards B and B′ may be raised and lowered at pleasure, or as it is desired to regulate the height of the furrow to be cut when the said plow is in operation. The said mold-boards B and B′ are held in any desired position by means of the slotted arms D D, Fig. 1, which are fastened to the frame A by means of the nuts and screws K K, shown at Fig. 2. L L, Fig. 2, are slotted arms running across the top of the frame, and held in position by the thumb-screw *l*, shown at Figs. 1 and 2, and which thumb-screw is fastened to the center frame-piece A′. These slotted arms L L and thumb-screw *l* are for the purpose of regulating the distance between the mold-boards B and B′, whereby the width of furrow to be cut is as hereinbefore described. The said mold-boards B and B′, or sections thereof, C and C′, being hinged to the center standard E′, allow the free working of the said mold-boards B and B′ laterally, while the slots *h h*, Figs. 1 and 6, allow the said mold-boards B and B′ to be elevated or depressed, as required, thereby regulating the height of the furrow to be cut, substantially as hereinbefore described. The frame-pieces A A are hinged or loosely riveted to the center frame-piece A′ at N, Figs. 1 and 2. At M, Figs. 1 and 2, may be fastened any suitable device for the purpose of fastening the horse or horses to said plow and cultivator.

The arms *b b*, nuts and screws *e*, N, *l*, and K, and slotted arms D D and L L may all be made of cast-iron and of any size, shape, and strength that will best answer the required purpose.

If desired to use the cultivator and not the plow, the plow may be readily removed by displacing the nut and screw *o*, Figs. 1 and 6, and the nuts and screws K K, Fig. 2, when it will be readily seen the mold-boards may be easily removed; or, if desired to use the plow alone, the teeth and standards may be readily removed, as will be seen by reference to the accompanying drawings.

Having thus described the nature of my said invention and improvements, what I claim, and desire to secure by Letters Patent of the United States, is—

1. The double mold-board B and C, so hinged and connected together that the main part of said mold-board B may be elevated or depressed at will, according to the height of furrow desired to be cut, substantially as hereinbefore described and set forth.

2. The hinging of the sections of the mold-board C and C′ to the center standard E′, whereby a lateral motion may be given to the mold-boards B and B′ to regulate the width of furrow to be cut, substantially in the manner and for the purposes more fully hereinbefore described and set forth.

3. The slotted arms or their equivalents D D, in combination with the mold-boards B and B′, substantially in the manner as and for the purposes herein described and set forth.

4. The curved reversible tooth H, with concave sides, the front surface of which is nearly flat, as and for the purposes set forth.

In testimony that I claim the foregoing I have hereunto set my hand this 28th day of March, 1873.

LEWIS R. WRIGHT.

Witnesses:

ALONZO P. STRONG,
EDWARD W. PAIGE.